United States Patent
Feustel et al.

(10) Patent No.: US 6,838,842 B2
(45) Date of Patent: Jan. 4, 2005

(54) METHOD FOR OPERATING A BRUSHLESS DIRECT CURRENT MOTOR

(75) Inventors: Hans-Peter Feustel, Roth (DE); Reinhard Orthmann, Mainz (DE)

(73) Assignees: Conti Temic microelectronic GmbH, Nuernberg (DE); DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/332,210

(22) PCT Filed: Jun. 28, 2001

(86) PCT No.: PCT/EP01/07384
§ 371 (c)(1),
(2), (4) Date: Jan. 3, 2003

(87) PCT Pub. No.: WO02/03538
PCT Pub. Date: Jan. 10, 2002

(65) Prior Publication Data
US 2003/0146729 A1 Aug. 7, 2003

(30) Foreign Application Priority Data
Jul. 6, 2000 (DE) .......................................... 100 32 896

(51) Int. Cl.[7] ................................................ H02P 3/18
(52) U.S. Cl. ...................... 318/254; 318/138; 318/439; 318/700; 318/705; 388/800; 388/806; 388/815
(58) Field of Search ................................. 318/254, 138, 318/439, 700, 705; 388/800–804, 806, 815

(56) References Cited

U.S. PATENT DOCUMENTS

| | | |
|---|---|---|
| 4,359,674 A | 11/1982 | Gotou |
| 4,988,273 A * | 1/1991 | Faig et al. ................... 425/145 |
| 5,457,366 A | 10/1995 | Wehberg et al. |
| 5,625,264 A * | 4/1997 | Yoon .......................... 318/254 |
| 5,640,073 A * | 6/1997 | Ikeda et al. ................. 318/439 |
| 5,825,972 A * | 10/1998 | Brown ........................ 388/811 |
| 5,901,268 A * | 5/1999 | Ando et al. ................. 388/811 |

FOREIGN PATENT DOCUMENTS

| | | |
|---|---|---|
| DE | 3006707 | 10/1980 |
| DE | 4310260 | 3/1993 |
| DE | 4142274 | 6/1993 |
| DE | 19725136 | 12/1998 |
| EP | 0930698 | 7/1999 |
| JP | 08275599 | 10/1996 |
| WO | WO87/04025 | 7/1987 |

* cited by examiner

*Primary Examiner*—Rina Duda
(74) *Attorney, Agent, or Firm*—W. F. Fasse; W. G. Fasse

(57) ABSTRACT

A brushless, synchronous direct current motor is operated by supplying a direct current voltage as an input voltage for commutating the motor phase windings. The speed of the synchronous motor is modified or varied in two speed ranges. In the first speed range, a linear change of the input voltage is carried out up to a speed threshold value. In the second speed range with higher speeds than in the first speed range, a vector modification of the input voltage is carried out, for example for controlling the speed of a fan motor.

9 Claims, 2 Drawing Sheets

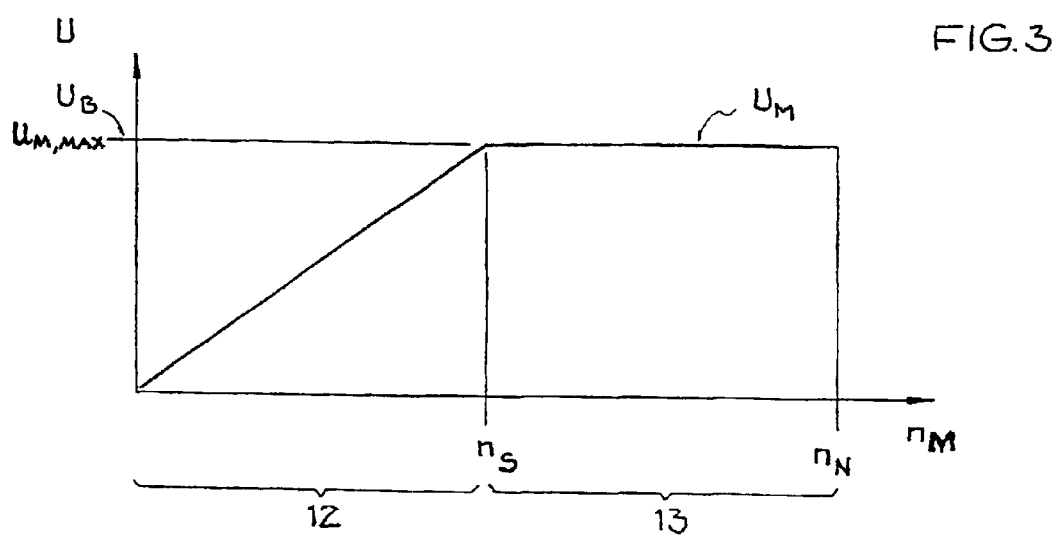

METHOD FOR OPERATING A BRUSHLESS DIRECT CURRENT MOTOR

FIELD OF THE INVENTION

Electrical drive units are used in a multitude of application areas, for example, for driving different movable components in a motor vehicle. Seats, window lifters, sun roofs are examples. Other components for example ventilators can be operated with a variable r.p.m. Electrical drive units comprise an electric motor for producing and providing of an electrical power output and a control module for controlling and monitoring the electric motor, for example for controlling the r.p.m. and power of the electric motor in closed loop fashion. The electric motors may be constructed as a.c. motors. Such motors are either asynchronous motors operating asynchronously to the input frequency, or synchronous motors operating synchronously with the input frequency with an external commutation of the motor phase windings for stepping the motor winding. Alternatively, the motors may be self-commutating d.c. motors, depending on an applied input voltage. If the commutating of the motor phase windings of permanent excitation synchronous motors is dependent on a position recognition, more specifically if the commutation takes place depending on the directly measured position of the rotor or on the rotor position determined from other motor characteristics, then the synchronous motors are operated just like electronically commutated, that is, self commutating d.c. motors (EC-DC motors). More specifically, the self commutating of the synchronous motor takes place depending on the input voltage applied to the individual windings of the synchronous motor. Such commutated synchronous motors are referred to as brushless d.c. motors.

In connection with r.p.m. controlled electrical drive units with brushless d.c. motors the variation of the r.p.m. of the synchronous motor is achieved by varying the amplitude of the d.c. input voltage applied to the individual windings of the synchronous motor during the commutation of the motor phase windings. The variation of the amplitude of the d.c. input voltage takes place, as a rule, through a clocked operation that is, for example, realized by means of pulse width modulation, of the commutation switches that perform the commutation of the motor phase windings. These commutation switches are particularly constructed as commutation transistors. More specifically, the commutation switches or commutation transistors are used for the commutation of the motor phase windings and for the clocking of the input voltage and thus for the variation of the amplitude of the applied input voltage and thus of the motor voltage.

In this connection it is disadvantageous that due to the switching transients caused by the clocked operation of the commutation switches or commutation transistors the current flow in the supply conductor for supplying the input voltage or d.c. voltage is periodically and abruptly interrupted and switched on again. Such switching transients have strong reaction effects on the supplied input voltage or d.c. voltage. In order to limit these adverse reactions during the operation of the brushless d.c. motor a large effort and expense is required for additional structural components such as EMV coils, storage capacitors, interference suppression capacitors, chokes and so forth, whereby substantial costs and a large space requirement are caused.

SUMMARY OF THE INVENTION

It is the object of the invention to provide a method for operating a brushless d.c. motor to achieve a simple reliable and cost effective operation of the brushless d.c. motor. This object is achieved according to the invention by the combination of the following steps:

a) supplying a d.c.-voltage as an input voltage ($U_E$) to said brushless synchronous d.c. motor for commutating motor phase windings, b) performing a linear closed loop control of an input voltage ($U_E$) in a first r.p.m.-range (12) up to an r.p.m.-threshold value ($n_s$) for varying an r.p.m. ($n_M$) of said brushless synchronous d.c. motor (10), and c) starting with an r.p.m. threshold value ($n_S$), performing a vector closed loop control of the input voltage ($U_E$), in a second r.p.m. range (13) having a higher r.p.m. ($n_M$) than said first r.p.m.-range (12) of said brushless synchronous d.c. motor (10).

According to the present method for varying the r.p.m. of the synchronous motor the d.c. voltage of the brushless d.c. motor and thus the input voltage that is supplied to the synchronous motor, is linearly controlled or continuously varied in closed loop fashion in a first r.p.m. range with low r.p.m.s. More specifically, the exact momentarily required motor voltage is supplied as input voltage to the synchronous motor. The difference between the motor voltage and the maximum input voltage is transformed into a dissipated power. Upon reaching an r.p.m. threshold value that depends on a predetermined voltage threshold value of the input voltage, the d.c. voltage is controlled in a closed loop manner in a second r.p.m. range that follows the first r.p.m. range toward higher r.p.m.s by a shifting of the vectors of the motor voltage (field orientation). More specifically, the voltage angle between the d.c. voltage that is applied to the respective motor winding of the synchronous brushless d.c. motor, namely the outer motor voltage of the synchronous motor or rather the motor terminal voltage, and the voltage at the rotor of the synchronous motor, namely the inner motor voltage of the synchronous motor or the EMK (electromotive force) or the revolving field voltage is rotated. Accordingly, the input voltage supplied to the synchronous motor for varying the r.p.m. is continuously changed in the first r.p.m. range by means of a closed loop linear control by adjusting the amplitude of the motor terminal voltage. This input voltage is supplied to the commutation switches or to the commutation transistors for commutating the motor phase windings of the synchronous motor. The variation in the first r.p.m. range takes place by a closed loop linear control by adjusting the amplitude of the motor terminal voltage to continuously vary the motor terminal voltage. In the second r.p.m. range the motor terminal voltage is controlled by means of a closed loop vector control through the field orientation by increasing the effective motor current of the synchronous motors and thus increasing the motor torque.

Particularly, the first r.p.m. range is extended by the linear closed loop control of the input voltage or motor terminal voltage, to a voltage threshold value that determines the r.p.m. threshold value at which the synchronous motor reaches its maximal motor terminal voltage. More specifically, the linear control of the input voltage extends to a point where the motor terminal voltage of the synchronous motor is equal to the maximum input voltage of the brushless d.c. motor, for example where it is equal to the operating voltage of the brushless d.c. motor. Thus, in the second r.p.m. range where the motor terminal voltage of the synchronous motor has a maximum and constant amplitude, the effective motor current of the synchronous motor is increased by the closed loop vector control and thus the motor torque is raised. By suitably dimensioning the brushless d.c. motor or rather the synchronous motor, one achieves a large second r.p.m. range compared to the first r.p.m. range. That means that the r.p.m. threshold value which is predetermined by the voltage threshold value is small. For this purpose it is preferred to use a synchronous motor having a high number of windings which motor reaches its maximum motor terminal voltage already at low r.p.m.s. The production of a closed loop controlled d.c. voltage as input voltage in the first r.p.m. range can be realized either by a closed loop linear control of the commutation switches or commutation transistors or it can be realized by a closed loop control element connected in series with the brushless d.c. motor and forming part of a control module of the electrical drive unit. More specifically, the closed loop control element is either a separate closed loop control unit connected in series with the brushless d.c. motor or the commutation switches or commutation transistors take over the function of the closed loop control unit. Preferably, the linear closed loop control of the input voltage in the first r.p.m. range is performed by a determined number of commutation switches or commutation transistors, which are linearly controlled by a closed loop control, whereby for each control phase of the synchronous motor either only one respective switch or transistor is controlled or all commutation switches or commutation transistors of the synchronous motor are controlled in a linear closed loop fashion. The respective commutation switch or commutation transistor is the one that is used for commutating the motor phase windings in the control phase. Similarly, the controlled commutation switches or commutation transistors are the ones used for the commutation of the motor phase windings in the control phase of the synchronous motor. Normally, two commutation switches or two commutation transistors are provided in a brushless d.c. motor for each control phase of the synchronous motor for commutating the motor phase windings. The first r.p.m. range extends only to relatively low r.p.m.s of the synchronous motor where the motor current of the synchronous motor is still low. Therefore, the dissipation power is also low. The dissipation power is the product of the motor current of the synchronous motor and a voltage difference. The voltage difference is the difference between the input voltage of the brushless d.c. motor and the motor voltage or motor terminal voltage of the synchronous motor. This voltage difference occurs as a voltage drop across the closed loop control element. The control element is either part of the linear closed loop control unit connected in series or the commutation switch itself.

Due to the combination of the linear closed loop controlled operation of the brushless d.c. motor at low r.p.m.s of the synchronous motor with the field orientation operation of the brushless d.c. motor at higher r.p.m.s of the synchronous motor, the linear closed loop control takes place in a range with low motor currents of the synchronous motor. Hence, dissipation losses are low. This applies particularly when using the brushless d.c. motor in blowers or pumps. Thus no interfering effects occur in the operation of the brushless d.c. motor. As a result, no over-dimensioned or additional structural elements are required as is the case when high dissipation power losses occur.

Since the commutation switches or commutation transistors are not clocked (not operating in a switching operation) and therefore no or only small disturbances occur in the supply conductor for feeding the input voltage, EMV-measures can be avoided or can be substantially reduced.

If in the first r.p.m. range the commutation switches or the commutation transistors themselves are controlled linearly in closed loop fashion, no additional power structural components or adjustment members are needed for the linear closed loop control. This is so because in the first r.p.m. range only a small dissipation power occurs due to the small motor currents of the synchronous motor. Thus, commercially available commutation switches or commutation transistors may be used.

BRIEF DESCRIPTION OF THE DRAWINGS

The present method will now be described in more detail in the following with reference to an example embodiment and in connection with the drawing, wherein:

FIG. 3 shows the characteristic of the r.p.m. of the synchronous motor of the brushless d.c. motor depending on the voltage.

DETAILED DESCRIPTION OF PREFERRED EXAMPLE EMBODIMENTS AND OF THE BEST MODE OF THE INVENTION

Figure 1:
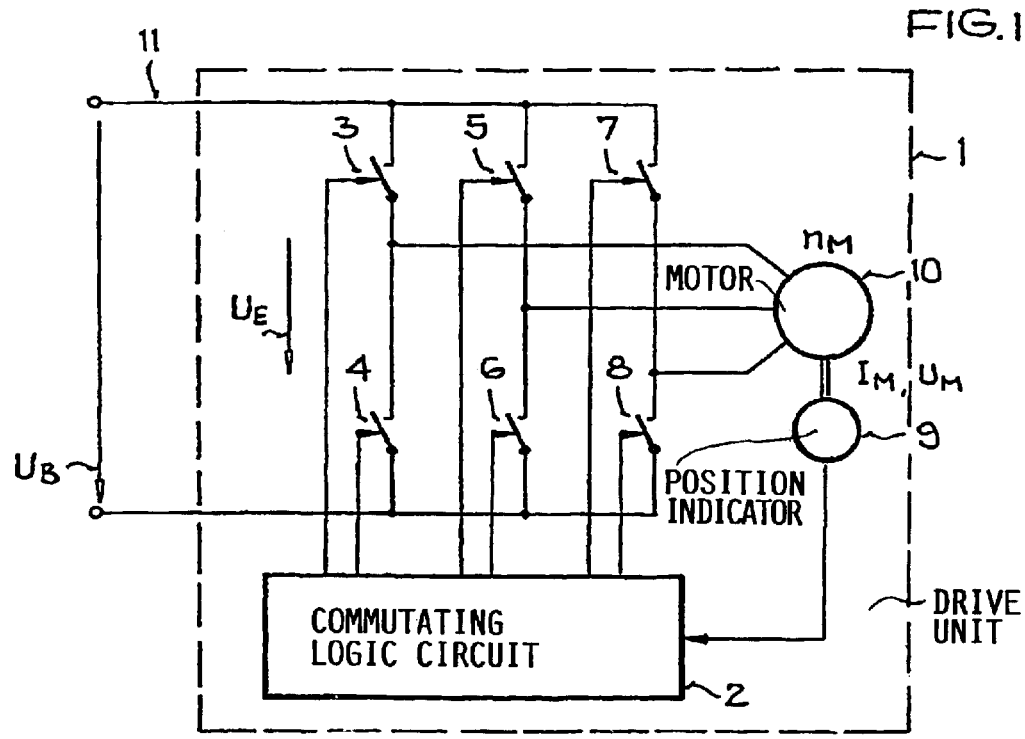
FIG. 1 shows a schematic block diagram of the essential components of the brushless d.c. motor.

According to FIG. 1 a variable input voltage $U_E$ is supplied as a d.c. voltage through a supply conductor 11 to a drive unit 1 including a brushless, synchronous d.c. motor 10 for varying the r.p.m. $N_M$ of said motor 10. The input voltage $U_E$ is obtained from a supply voltage $U_E$ of the brushless, synchronous d.c. motor 10. For example the supply voltage $U_E$ is 13.5 volts. The drive unit 1 with the brushless, synchronous d.c. motor 1 comprises six commutation transistors 3 to 8 operated in a bridge circuit as commutation switches for commutating the motor phase windings of the brushless, synchronous d.c. motor 10. Two commutation transistors 3, 4; 5, 6; 7, 8 are provided for each control phase for commutating the motor phase windings of the motor 10. A position indicator 9 evaluates the motor position, or rather the position of the synchronous motor 10. For example, three Hall sensors generating a digital output signal may be used as the position indicator 9. The output signal of the position indicator 9 is supplied to a commutating logic circuit 2 which triggers the commutation transistors 3 to 8 depending on the instantaneous motor position of the synchronous motor 10 to thereby commutate the windings of the synchronous motor 10.

Figure 2:
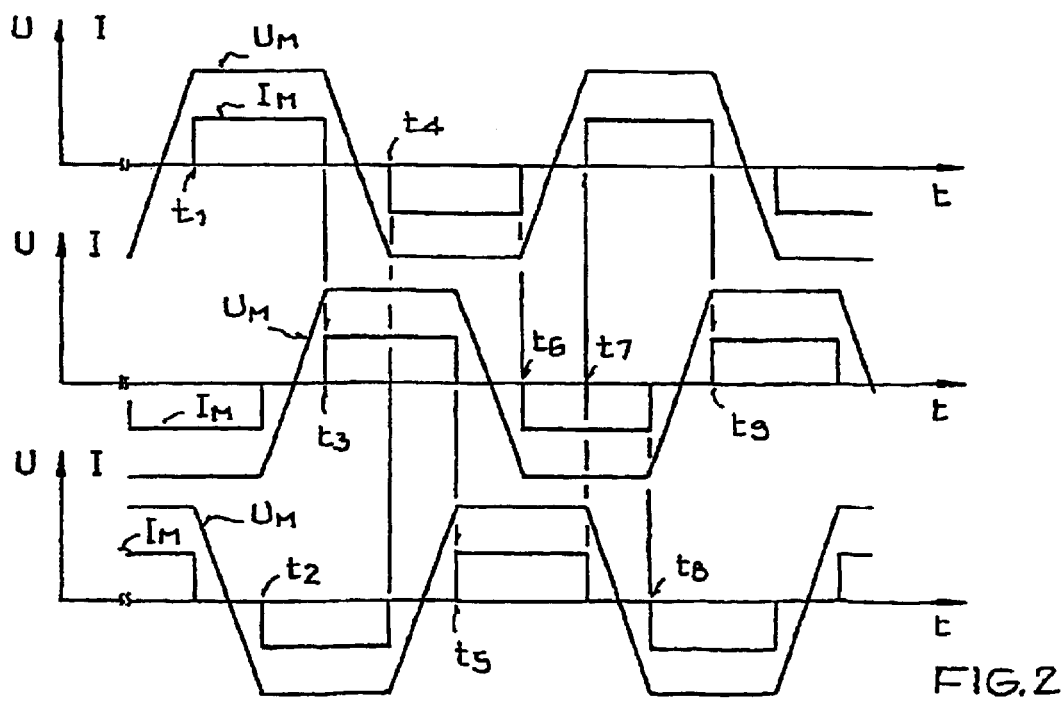
FIG. 2 shows the curve of the motor voltage and the motor current of the synchronous motors of the brushless d.c. motor as a function of time during the commutation or energizing of the motor windings of the synchronous motor.

FIG. 2 illustrates as a function of time the commutation sequence of the synchronous motor 10 which is energized in three trigger phases by a three-phase current. FIG. 2 shows the motor voltage which is the motor terminal voltage $U_M$ applied to the windings of the synchronous motor 10, and the motor current $I_M$ of the synchronous motor 10. The commutation of the motor phase windings of the synchronous motor 10 is performed cyclically respectively in 60° steps following each revolution of the synchronous motor 10 as recognized by the position indicator 9. The commutation is performed at commutation points of time when the motor terminal voltage $U_M$ has reached its respective maximum value where it corresponds approximately to a d.c. voltage. The commutation points of time are predetermined by the commutation logic circuit 2. The commutation is realized by the switching of the commutation transistors 3 to 8. The commutation points of time for switching on the motor current $I_M$ in the respective motor phase winding of the synchronous motor 10 are the points of time t1, t3, t5, t7, t9 . . . for the positive half wave of the motor terminal voltage $U_M$. The commutation points of time for the negative half wave of the motor terminal voltage $U_M$ are t2, t4, t6, t8, . . . This switching avoids a waviness in the current characteristic of the total current formed as the sum of the motor currents $I_M$ of the individual motor phase windings. As a result, an approximate d.c. current is present in the supply conductor 11 and thus no current peaks occur.

FIG. 3 illustrates the characteristic of the motor voltage or motor terminal voltage $U_M$ as a function of the r.p.m. $n_M$ of the synchronous motor 10. For varying the r.p.m. $n_M$ in a first r.p.m. range 12 up to the r.p.m. threshold value $n_S$, the motor terminal voltage $U_M$ present at the motor windings of the synchronous motor 10 is varied by a linear closed loop continuous control. Thus, in the first r.p.m. range 12 the r.p.m. of the synchronous motor 10 is a function of the motor terminal voltage $U_M$. In the second r.p.m. range 13 starting with the r.p.m. threshold value $n_S$ up to the nominal value $n_N$ of the r.p.m. $n_M$ of the synchronous motor 10, the inner motor voltage or the pole wheel voltage or the EMK (electromotive force) is controlled by a closed loop control of the field orientation while keeping the motor terminal voltage $U_M$ constant. Stated differently in the second r.p.m. range 13 the r.p.m. is a function of the voltage angle between the constant motor terminal voltage $U_M$ and the inner motor voltage or pole wheel voltage or EMK of the synchronous motor 10. More specifically, the r.p.m. threshold value $n_S$, is defined as that r.p.m. $n_M$ of the synchronous motor 10 at which the input voltage $U_E$, and thus the motor terminal voltage $U_M$ of the synchronous motor 10 achieves the value of the supply voltage $U_E$ that is the motor terminal voltage $U_M$ achieves the maximum value $U_{M\ MAX}$. This maximum value $U_{M\ MAX}$ of the motor terminal voltage $U_M$ is achieved already at small r.p.m.s $n_M$ of the synchronous motor 10 by a suitable dimensioning of the synchronous motor 10. More specifically, the r.p.m. threshold value $n_S$ is accordingly small so that the second r.p.m. range 13 with the closed loop control of the field orientation also begins already at small r.p.m.s $n_M$ of the synchronous motor 10.

For example, if it is intended to vary the r.p.m. $n_M$ of the brushless synchronous d.c. motor 10 of the drive unit 1 constructed as a blower motor, in an r.p.m. range between 400 r.p.m. and 2400 r.p.m., wherein the latter is the nominal r.p.m. $n_N$, then upon reaching the nominal r.p.m. $n_N$ of, for example 2400 r.p.m., the defined or rated power output of the synchronous motor 10 is produced. The synchronous motor 10 comprises, for example a maximum input power of 400 W at a motor terminal voltage $U_M$ of 13.5 V and thus a maximum motor current $I_M$ of 30 A. This motor current is distributed by means of six commutation transistors 3 to 8 onto the motor windings of the synchronous motor 10. Due to the nonlinear load characteristic of the blower the maximum dissipation power, for example about 45 W, occurs during the linear closed loop control at 70% of the nominal r.p.m. $n_N$, for example at 1680 r.p.m. In case the commutation transistors 3 to 8 themselves are used for the linear closed loop control, the dissipation power is distributed onto these commutation transistors 3 to 8. As a result, the maximum dissipation power for each of the commutation transistors 3 to 8 is 7.5 W, provided each of the six commutation transistors functions as a closed loop control element. If only three commutation transistors function as closed loop control elements, the dissipation power per control element is 15 W. Commercial transistors having an ON resistance of, for example 12 mΩ, have, however, in a switching operation at the maximum current of the motor current $I_M$ of 30 A a permissible dissipation power of 3.6 W. Thus, an over-dimensioning of the commutation tranistors 3 to 8 would become necessary.

However, the maximal dissipation power is reduced to 10 W at about 40% of the nominal r.p.m. $n_N$, for example 960 r.p.m. due to the small range of the linear closed loop control, if the following conditions are satisfied. First, a linear closed loop operation at small r.p.m.s $n_M$ is combined with a field orientation operation at higher r.p.m.s $n_M$ for the above described synchronous motor 10 having a maximum input power of 400 W. Second, the synchronous motor 10 is so constructed, for example by increasing the number of the motor windings by, for instance 50%, that the synchronous motor 10 achieves the maximum $U_{M\ MAX}$ of the motor terminal voltage $U_M$ already at 50% of the nominal r.p.m. $n_N$ of, for example, 2400 r.p.m., that is at 1200 r.p.m. Third, the supply voltage $U_E$ of, for example 13.5 V is equal to the motor terminal voltage $U_M$. Fourth, the variation of the r.p.m. $n_M$ the second r.p.m. range 13 is achieved through the field orientation, more specifically through the adjusting of the angle between the motor terminal voltage $n_M$, which is the maximal motor terminal voltage $n_{M\ MAX}$, and the inner voltage, namely the pole wheel voltage or the EMK (electromotive force) of the synchronous motor 10. If the commutation transistor 3 to 8 are again used themselves for the linear closed loop control, this dissipation power is distributed onto the commutation transistors 3 to 8. As a result, the maximal dissipation power of each commutation transistor 3 to 8 amounts only to 1.7 W, provided all six commutation transistors functions as closed loop control elements. The dissipation power is only 3.3 W in case only three commutation transistors function as closed loop control element. This maximal dissipation power is smaller than the permissible dissipation power of 3.6 W of conventional transistors having an ON resistance of, for example 12 mΩ and the maximal current of the motor is 30 A.

Due to the combination of the linear closed loop operation with the field orientation operation it is possible to avoid a clocked operation of the commutation transistor 3 to 8, whereby no rapid switching operations take place and thus interference suppression measures are not necessary.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for operating a brushless synchronous d.c. motor (1) comprising the following steps:
    a) supplying a d.c.-voltage as an input voltage ($U_E$) to said brushless synchronous d.c. motor (10) for commutating motor phase windings,
    b) performing a linear closed loop control of an input voltage ($U_E$) in a first r.p.m.-range (12) up to an r.p.m.-threshold value ($n_S$) for varying an r.p.m. ($n_M$) of said brushless synchronous d.c. motor (10), and
    c) performing, when said r.p.m.-threshold value ($n_S$) has been reached, a vector closed loop control of the input voltage ($U_E$), in a second r.p.m. range (13) having a higher r.p.m. ($n_M$) than said first r.p.m.-range (12) of said brushless synchronous d.c. motor (10).

2. The method of claim 1, further comprising:
    d) selecting a voltage threshold value depending on a given supply voltage ($U_E$) of said brushless synchronous d.c.-motor (1), and e) setting said r.p.m.-threshold value ($n_S$) in accordance with said voltage threshold value.

3. The method of claim 2, further comprising determining a maximum motor terminal voltage ($U_{M,MAX}$) of said brushless synchronous d.c. motor (10) as said voltage threshold value which in turn determines said r.p.m.-threshold value ($n_S$) depending on said given supply voltage ($U_E$) of said brushless synchronous d.c. motor (1).

4. The method of claim 3, further comprising constructing said brushless synchronous d.c. motor (10) so that it reaches its maximum motor terminal voltage ($U_{M,MAX}$) at a low r.p.m. ($n_M$).

5. The method of claim 1, further comprising commutating said motor phase windings of said brushless, synchronous d.c. motor (10) by commutation switches (3 to 8).

6. The method of claim 5, further comprising using for said commutating of said motor phase windings two of said commutation switches for each of said motor phase windings.

7. The method of claim 5, further comprising controlling in closed loop fashion said input voltage ($U_E$) in said first r.p.m.-range (12) of each of said motor phase windings by using at least one commutation switch of said two commutation switches used for each of said motor phase windings.

8. The method of claim 1, further comprising connecting a closed loop control element in series with said brushless synchronous d.c.-motor (10) for a linear closed loop control of said input voltage ($U_E$) in said first r.p.m.-range (12).

9. The method of claim 5, further comprising using transistors as said commutation switches (3 to 8).

* * * * *

UNITED STATES PATENT AND TRADEMARK OFFICE
CERTIFICATE OF CORRECTION

PATENT NO. : 6,838,842 B2
DATED : January 4, 2005
INVENTOR(S) : Feustel et al.

It is certified that error appears in the above-identified patent and that said Letters Patent is hereby corrected as shown below:

Column 1,
Line 10, cancel the line and replace to read:
-- be operated with a variable r.p.m.

BACKGROUND INFORMATION

Electrical drive units --.

Column 4,
Lines 31 and 33, after "supply voltage", replace "$U_E$" by -- $U_B$ --;

Column 5,
Line 31, after "supply voltage", replace "$U_E$" by -- $U_B$ --.

Column 6,
Line 16, after "supply voltage", replace "$U_E$" by -- $U_B$ --;
Line 24, after "commutation", replace "transistor" by -- transistors --;
Line 51, after "motor", replace "(1)" by -- (10) --;
Line 66, after "supply voltage", replace "($U_E$)" by -- ($U_B$) --.
Line 67, after "d.c.-motor", replace "(1)," by -- (10), --.

Column 7,
Line 7, after "supply voltage", replace "($U_E$)" by -- ($U_B$) --;
Line 8, after "motor", replace "(1)." by -- (10). --.

Signed and Sealed this

Twenty-fourth Day of May, 2005

JON W. DUDAS
*Director of the United States Patent and Trademark Office*